(12) United States Patent
Woolley et al.

(10) Patent No.: US 9,536,094 B2
(45) Date of Patent: Jan. 3, 2017

(54) MEDIATED SECURE BOOT FOR SINGLE OR MULTICORE PROCESSORS

(71) Applicant: Raytheon Company, Waltham, MA (US)

(72) Inventors: Brandon Woolley, Richardson, TX (US); Norman Cramer, Flower Mound, TX (US); Brian Mcfarland, Allen, TX (US); Matthew Hammond, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 349 days.

(21) Appl. No.: 14/154,015

(22) Filed: Jan. 13, 2014

(65) Prior Publication Data

US 2015/0199520 A1    Jul. 16, 2015

(51) Int. Cl.
*G06F 9/24* (2006.01)
*G06F 15/177* (2006.01)
*G06F 1/24* (2006.01)
*G06F 11/00* (2006.01)
*G06F 12/14* (2006.01)
*G06F 21/57* (2013.01)
(Continued)

(52) U.S. Cl.
CPC .............. *G06F 21/575* (2013.01); *G06F 1/24* (2013.01); *G06F 9/44505* (2013.01); *G06F 21/57* (2013.01); *G06F 9/4401* (2013.01); *G06F 9/4405* (2013.01); *G06F 15/177* (2013.01)

(58) Field of Classification Search
CPC .. G06F 9/4401; G06F 21/575; G06F 9/44505; G06F 21/57; G06F 15/177; G06F 1/24; G06F 9/4405

USPC .............................. 713/1, 2, 100; 726/16, 22
See application file for complete search history.

(56) References Cited

U.S. PATENT DOCUMENTS

| | | | | |
|---|---|---|---|---|
| 7,577,726 | B1 * | 8/2009 | Conard | G06F 8/665 709/221 |
| 9,047,471 | B2 * | 6/2015 | Polzin | G06F 21/60 |

(Continued)

OTHER PUBLICATIONS

Freescale Semiconductor, Inc. Data Sheet: Technical Data; "P4080/P4081 QorIQ Integrated Processor Hardware Specifications"; Doc No. P4080EC; Rev. 5; 160 pages.

*Primary Examiner* — Ji H Bae

(57) ABSTRACT

A system and methods are disclosed for securely booting a processing system using a three step secure booting process. Several embodiments are presented, wherein upon power-on-reset, the first boot step uses a secure boot device comprising of a programmable device or an FPGA which boots up first, validates its configuration file and then validates the processor(s) configuration data before presenting the configuration data to the processor(s). This enables validation of 'pre-boot' information, such as the Reset Control Word and pre-boot processor configuration data. The second and third boot steps validate the internal secure boot code and external boot code respectively using one or more of secure validation techniques, such as encryption/decryption, Key mechanisms, privilege checking, pointer hashing or signature correlation schemes. This results in an end-to-end secure boot process for a variety of architectures, such as single processor systems, synchronous and asynchronous multiprocessing systems, single core systems and multi-core processing systems.

20 Claims, 5 Drawing Sheets

(51) Int. Cl.
*G06F 9/445* (2006.01)
*G06F 9/44* (2006.01)

(56) References Cited

U.S. PATENT DOCUMENTS

2006/0247004 A1* 11/2006 Tanimura .............. G06F 21/575
  463/20
2010/0125739 A1* 5/2010 Creary .................. H04L 9/0822
  713/189
2012/0303941 A1* 11/2012 Grieco ................... G06F 21/76
  713/2

* cited by examiner

MEDIATED SECURE BOOT FOR SINGLE OR MULTICORE PROCESSORS

TECHNICAL FIELD

The present disclosure is directed in general to processor architecture and, more particularly to a mediated secure boot for a single or multicore processors

BACKGROUND OF THE DISCLOSURE

The term 'boot' is used to describe a start-up process when power is applied to a device. A processing system has a boot process that describes a configuration sequence to start up a processing system at power-on. The most common boot techniques require the processor to wake up first, initialize itself and then initialize the rest of the system as part of a pre-determined boot sequence. Once the processor wakes up, the processor sets up initial values in the I/O and memory control registers—before access to memory or I/O can begin. The start sequence usually starts with the processor sensing some boot configuration pins during a power-on-reset to select one of the supported boot methods. In most systems, the processor boot configuration pins are hard wired to power or ground to indicate the boot method. Once the boot method is chosen, the processor will look for its initial set of configuration parameters on a pre-defined set of pins or a signal bus. In all these known techniques, the low level initial configuration values and initial boot parameters that set up the processor in the initial stages of power-on do not get validated for conformance to security rules—a key concern for secure systems.

There has been a long felt need in Secure Processing Systems for a secured boot technique that provides for validation of low level processor configuration and boot parameters. The issue of secure boot gets compounded in multicore processors where more than one processor tries to wake up in a secured state—all at the same time.

In a secure system, every piece of data must be validated.

SUMMARY OF THE DISCLOSURE

To address one or more of the above-deficiencies of the prior art, this disclosure provides several embodiments of a secured boot process for both single and multicore processing systems.

In this inventive secure boot technique, the boot sequence is divided into three phases, namely, Pre-boot Loader Phase, Internal Secure Boot Code Phase and External Secure Boot Code Phase. In some of the embodiments presented in this disclosure, as part of the Pre-boot Loader Phase, a secure boot device such as a Field Programmable Gate array (FPGA) or a Programmable Logic Array wakes up first in a secure mode where the secure boot device validates itself, including its configuration bits and logic states—and uses this validated logic to further acquire and validate the processor's initial configuration data, such as the Reset Control Word (RCW) and the Pre-boot image (PBI). After the secure boot device validates the RCW and PBI, the secure boot device wakes up the processor from the Power-on-reset and presents the RCW and PBI to the processor interface. In contrast to known boot techniques, the disclosed secure boot technique does not wake up the processor first. Instead, upon a Power-on-reset, a secure boot device such as an FPGA wakes up first in a secure mode and executes some validation sequences, then wakes up the processor by presenting a validated set of pre-boot processor configuration parameters. In the case of multi-core processing systems, this secure FPGA will acquire, validate and present the RCW and PBI for all processing cores and wake them up in a known sequence. The sequence can be varied based on synchronous or asynchronous multiprocessing system's needs. After this initial secure wake up sequence, additional security screenings—such as encryptions, decryptions, checking security keys, domain privilege checking, hashing schemes and signature correlations—are enforced for both the internal secure boot codes and external secure boot codes to complete the secure boot process.

Secure initial boot (pre-boot) offers security validations of the critical first few steps in the processor boot sequence when Power-on-reset is applied. The secure initial boot makes sure that subsequent security validations of internal secure boot codes (ISBC) and external secure boot codes (ESBC) through encryption, keys or other means have validity, in a secure processing system. This disclosure provides for a total (100%—beginning-to-end) validation of a secure boot process for both single and multicore processing systems.

Certain embodiments may provide various technical advantages depending on the implementation. For example, a technical advantage of some embodiments may include the capability for the secure FPGA to use external non-volatile memory instead of its internal non-volatile memory to obtain and validate the initial reset control word and/or the pre-boot image that is used to wake up the processor(s). Variations of these techniques are possible using the concepts described herein for one skilled in the art and these variations are considered to be within the scope of this invention and anticipated by this invention.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

One of the key requirements of a secure system is to secure and validate all components of the system from the moment power is applied. A secure system requires a secure processing system. Usually, the processing system is secured first before securing the rest of the system. A secure processing system requires a secure boot process. This is to ensure that as the processor wakes up, every bit of initial configuration data is validated for conformance to security rules before the processor can perform its own validations per the security rules established for the system. This key initial step of validating the "pre-boot" events and data is hard to achieve as the "trustability" starts from the time the processor(s) senses the power-on-reset and as the wake up sequence starts with the Reset Control Word (RCW).

Figure 1:
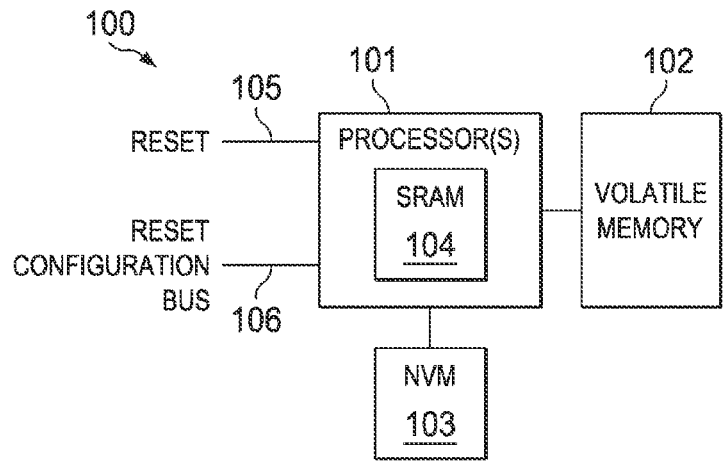
FIG. 1 illustrates a traditional processor boot sequence using external non-volatile memory, a technique known in the prior art.

FIG. 1 illustrates a traditional processor boot sequence using external non-volatile memory, a technique known in the prior art. More particularly, FIG. 1 illustrates the traditional boot process 100 where processor 101 has one or more power-on-reset pins 105 that get toggled to initiate the power-on-reset sequence. The first set of words that get read, often called "Reset Control Words" (RCW), determine the initial state to begin the boot sequence. This RCW is usually a sequence of words that have specific implied meaning based on the chosen processor. Based on the processor of choice, this RCW is read through some set of pins 106. A set of hard-wired logic gates or external non-volatile memory (NVM) 103 usually provides this initial RCW to the set of pins 106 without any check or validation. The processor 101 may have on board Static RAM (SRAM) 104 and is usually also connected to an external volatile memory 102, such as SRAM or Dynamic Random Access Memory (DRAM).

Usually, the processor 101 is the first one to come alive from the power-on-reset as no memory or I/O transaction can take place without their respective control registers initialized—a job usually done by the processor 101 as it boots up. As part of the boot sequence, the processor 101 initializes these control registers including memory control registers and DMA (Direct Memory Access) pointers that are necessary to initiate communication to memory and I/O devices. So, the rest of the system usually comes alive after the processor 101 has booted up.

The problem with the state of the art boot process is that the initial RCW and/or the boot image could not be validated from the system security standpoint. A truly trusted system could not be created. Techniques such as encryption schemes, key checks and various privilege level checks in software cannot solve this problem as this breach in security happens at the very beginning of the boot process when the processor 101 is not yet executing code.

The word validation as used here is defined in the context of checking to see if it passes security rules of secure processing systems. In secure systems, the security rules may require checking data or instruction for authenticity, valid range of values, the privilege levels of the process seeking to have access or execute and possessing the appropriate characteristics defined for access to a specific memory region or domain or code or communication protocol to which the process is entitled to. To implement the security rules, a variety and combinations of security mechanizations may be used—such as cryptographic techniques, signature correlations, public and private keys, use of various privilege levels, encryptions—decryptions, hashing and coding techniques. When a processor wakes up upon a power-on-reset, some of its privilege and security levels and characteristics are defined at this time. Validating these initial processor configuration bits against a set of pre-set security rules is a vital task in a secure processing system.

In the case of various types of multiprocessing systems, this issue of lack of security validation of initial boot steps gets compounded as it exists for each processor in the system. Even in the case of multi-core processors where one of the processor cores is dedicated as a control processor, the security hole stated above still exists at the control processor that usually comes alive first.

To solve this problem, an embodiment of the current disclosure introduces a three step boot sequence, namely the Pre-Boot Load (PBL) phase, Internal Secure Boot Code (ISBC) phase, and the External Secure Boot Code (ESBC) phase. The disclosure offers several embodiments to validate even the initial Reset control words and the initial load image that starts the boot process.

Figure 2:
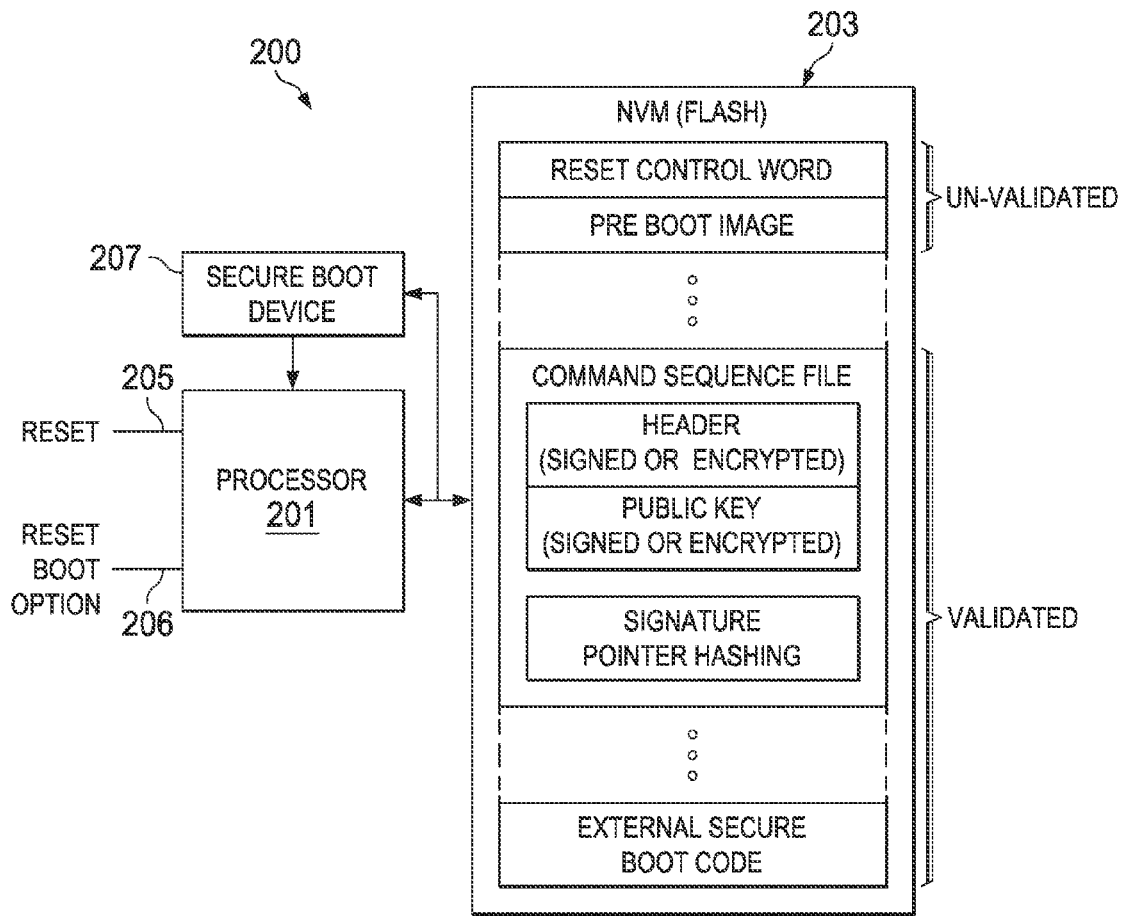
FIG. 2 illustrates a partial secure boot process according to an embodiment of the present disclosure.

FIG. 2 illustrates a partial secure boot process 200 according to an embodiment of the present disclosure. The Processor(s) 201 is subjected to a Power-on-Reset on one or more pins 205 and the boot options can be selected on the sensing pins 206, by hard wiring or other means as outlined earlier. The boot option selected will require the processor to read the Reset Control Word and the Pre-Boot Image (PBI) from a non-volatile memory starting from a pre-determined location. The RCW and the PBI will set up the necessary security mechanizations inside the Processor 201 and in the Security Boot Device 207, the Security Boot Device 207 typically being an FPGA, but can be any programmable logic device. Security Boot Device 207 implements in the hardware some of the security checks, while the processor implements additional security mechanizations via code (Software). After validating the security mechanizations, typically via signed cryptographic techniques, the PBI securely points to a validated Command Sequence File (CSF) that will start the ISBC phase. Through various security mechanizations, such as the use of cryptographic techniques, use of public and private keys, encryption and decryption mechanisms, pointer hashing and signature correlations, the ISBC boot code is validated before launching the ISBC boot code. In a similar fashion, after the ISBC is completed, external devices and processors are booted up using the ESBC code that are first validated using one or more of the various security mechanizations listed earlier. This phased step-by-step validation and inclusion of various parts of the system gradually, provides for a structured and verified boot sequence.

The problem with the boot sequence outlined in the disclosure associated with FIG. 2 is that it still leaves a hole at the Pre-Boot Phase by not validating the RCW and PBI, while solving the validation of internal and external boot codes and the security mechanizations. Accordingly, FIG. 3 provides an embodiment where even the RCW and the pre-boot image get validated.

Figure 3:
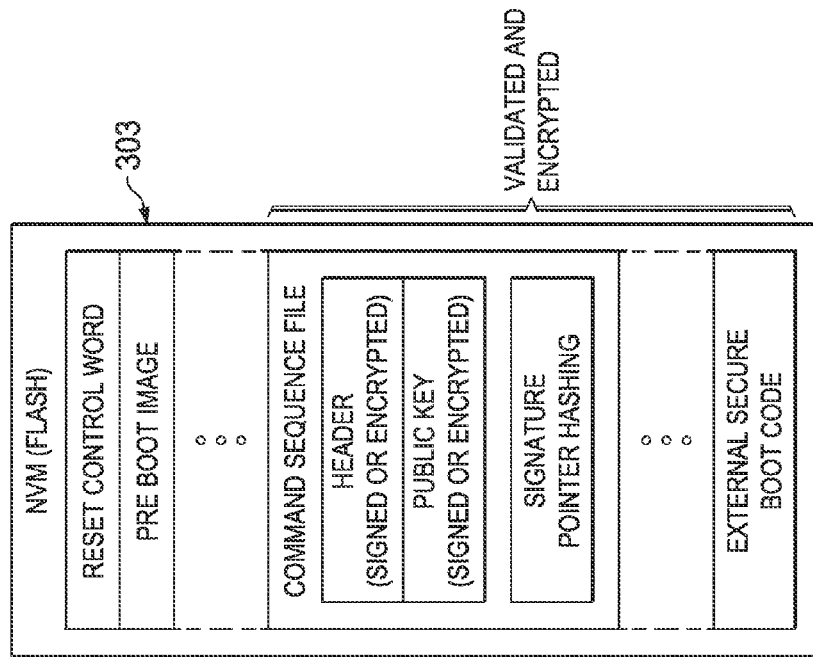
FIG. 3 illustrates an embodiment of the present disclosure that provides for a 100% secure boot process for both a single and multi-core processing systems.

FIG. 3 illustrates an embodiment of the present disclosure that provides for a 100% secure boot process 300 for both a single and multi-core processing systems. Here, unlike the traditional systems, the processor does not come up alive first. In this embodiment of the boot process 300, a secure boot device, 307—such as a XILINX FPGA—is used to implement the pre-boot security validations—and is the first one to come up. The FPGA boots securely and validates itself first, and generates or fetches the RCW and PBI, validates them and wakes up the processor 301 using the processor reset pins 305 while presenting the necessary information on the processor pins 306 (Reset Configuration Pins) and/or Reset Data and Control busses 308, to accomplish a secured pre-boot. The ISBC and ESBC steps can be either validated in this security FPGA or by means described earlier using an external Non-Volatile Memory (NVM) 303 and validation firmware. This provides for a total—100% validation and verification—of the entire secure boot process.

A variation of FIG. 3 (not shown) is for the FPGA 307 to generate the RCW and PBI from its own configuration bits as part of configuring the FPGA 307 and not have to fetch it from the NVM 303. In this case, the NVN 303 may or may not contain the RCW and the PBI. Also, the NVM described in various figures in this disclosure can be split physically to various Non-Volatile Memories having same or different access mechanizations and connections. For example, the configuration bits of the Secure Boot Device can be stored in a separate Non-Volatile Memory that is connected only to the security boot device and accessible only by the security boot device.

Various configurations are possible around the techniques described here. For example, the secure boot device (ex.: FPGA) may use an external NVM to provide any or all of the following: its configuration bits, validation bits, RCW, PBI, various keys, hashing vectors, signature correlations, and/or other commands to implements the security check. An important aspect is that all bootstrapping fields, parameters and data are first validated by the secure boot device as it boot straps itself through a controlled sequence of validated bootstrapping and logic inclusion—before configuring the processors, memory interface control registers and I/O control registers and other system resources. The logic that validates the NVM data and control are first validated in this controlled boot strapping process.

In the case of multi-core systems, the secure boot device wakes up first in a secured state and then concurrently or sequentially wake up each of the processing nodes by validating the RCW and PBI for each of the cores. Various embodiments and/or configurations are possible using this underlying principle. In the case of multiprocessing systems, there can be one or more of this secure boot device to provide this secure initial boot phase and subsequent synchronizations of the processors by controlling the release of reset and presenting their boot parameters at the same time. In asynchronous multiprocessing systems, one or more secure boot devices provide the necessary pre-boot validation and can do so in a sequential manner.

Figure 4:
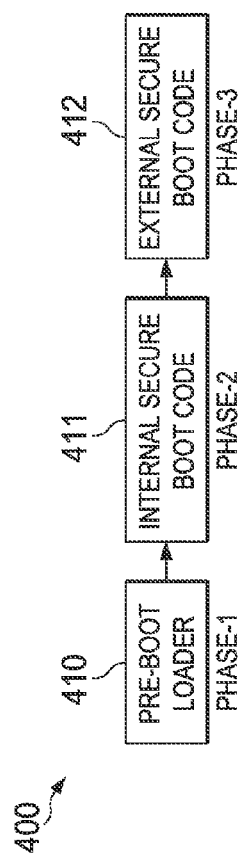
FIG. 4 illustrates the three phases of a secure boot sequence according to an embodiment of the present disclosure.

FIG. 4 illustrates the three phases of a secure boot sequence according to an embodiment of the present disclosure. FIG. 4 shows a boot flow 400 consisting of a Pre-Boot Load (PBL) phase 410 followed by an Internal Secure Boot Code (ISBC) phase 411, which is then followed by the External Secure Boot Code (ESBC) phase 412. Each phase will securely bring a part of the system alive and different embodiments of this invention can provide the security validations necessary for each phase.

Figure 5:
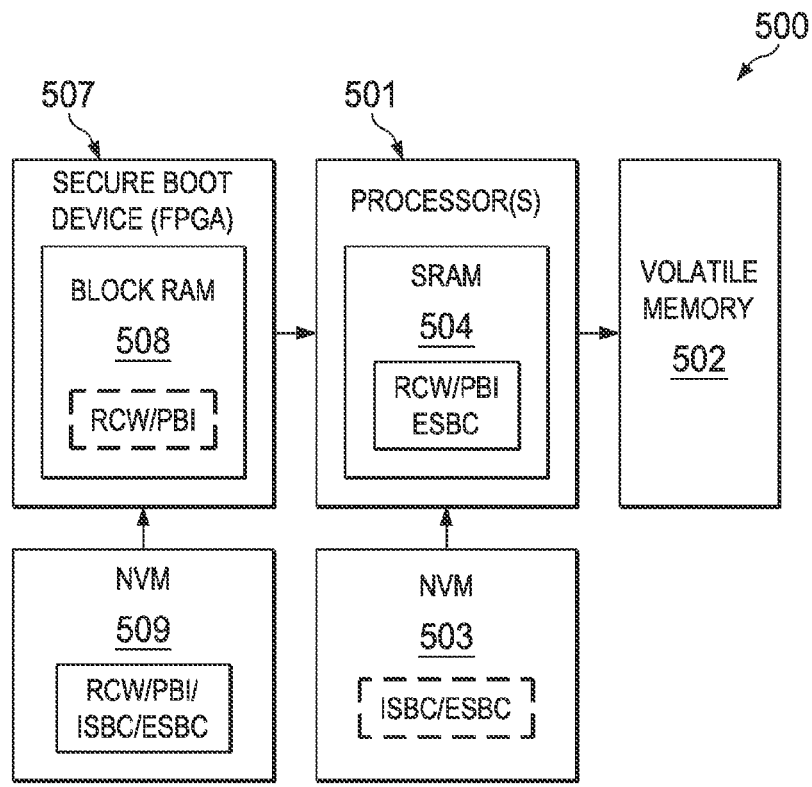
FIG. 5 illustrates the high level implementation of the three phases of a secure boot sequence, according to an embodiment of the disclosure.

FIG. 5 illustrates the high level implementation of the three phases of a secure boot sequence 500, according to an embodiment of the disclosure. In this embodiment, a secure boot FPGA 507 wakes up first upon power-on-reset and loads its configuration file from an external NVM 509 or an internal NVM (not shown). After the FPGA 507 is configured, the FPGA's validation logic is tested and validated first, using additional data stored at NVM 509 to check the security rules. As part of its configuration or after its configuration, the FPGA 507 downloads the Reset Control Word (RCW) and/or the Pre-boot Image (PBI) from NVM 509. The FPGA 507 can optionally store the Rest Control Word and the Pre-Boot Image in its internal Block RAM (BRAM) 508. The processor 501 is held at Reset by this FPGA 507 and/or other external circuitry during this entire time—until the FPGA 507 has completed fetching of the RCW and PBI and has checked and validated for security. After this step, the FPGA 507 releases the Reset to the processor 501 and presents the RCW to the bus or pins as required by the processor 501 to initiate its boot process. The processor 501 can store this validated RCW and PBI in its internal memory—SRAM 504—for use in subsequent soft resets. Optionally, the processor 501 can get the validated RCW and PBI from the FPGA 507 for subsequent soft resets. ISBC can be stored in either the FPGA memory (e.g., 508) or the NVM 509 attached to it or in a separate shared NVM (not shown). As described earlier, the processor 501 may use combination of many security validation techniques—such as using Cryptographic techniques, Keys, signature analysis, encryption—decryption methods and/or pointer hashing schemes. After completion of ISBC validation and execution, ESBC can begin after downloading the ESBC from an external NVM 503 or other sources. ESBC code is typically stored in the NVM connected to the Secure Boot Device (NVM 509), though optionally, it can reside in NVM 503 that is connected to the processor 501. External RAM 502 can be used to store the validated boot codes from any of the phases for subsequent use for soft resets. After completion of the ESBC phase, the processor 501 gives control to the process controller to begin executing code—or do other housekeeping tasks.

In the ISBC phase, the security rules will first require the pointer to a command sequence file (CSF—that controls the ISBC phase) in the NVM 503 to be validated first. The ISBC code starts off with this CSF pointer being validated, and then fetches all the controls the ISBC code needs to start checking for security rules. This set of control parameters that dictate the security rules are contained in the CSF, followed by a header and a public key that dictates the current process's privileges and security constructs. Then the ISBC code gets its signature stamp. Finally, the processor fetches a hash pointer that starts off the execution of the rest of the ISBC code.

Although a particular validation mechanism is provided, one of ordinary skill in the art will recognize that other variations are available. The basic premise of the validation is that the pointer to the area that contains the security rules for checking must first be checked per a pre-determined set of security rules and privileges, before the rules themselves can be accessed and downloaded to the internal logic. Such secure boot-strapping is a necessary element of a totally secure system. Such security validations are carried out in all three phases—the pre-boot phase, ISBC phase and the ESBC phase of the boot process, though the rules themselves can vary for each phase of the boot process.

The Pre-Boot phase has been traditionally the hardest one to validate in most processing architectures from the stand point of secure boot. To test embodiments of the disclosure against goals of a secure system, a multi-level secure system was implemented and some of the embodiments of this invention were tested using a QORIQ e500-mc multicore architecture (QorIQ) and chipset by FREESCALE SEMICONDUCTOR.

Figure 6:
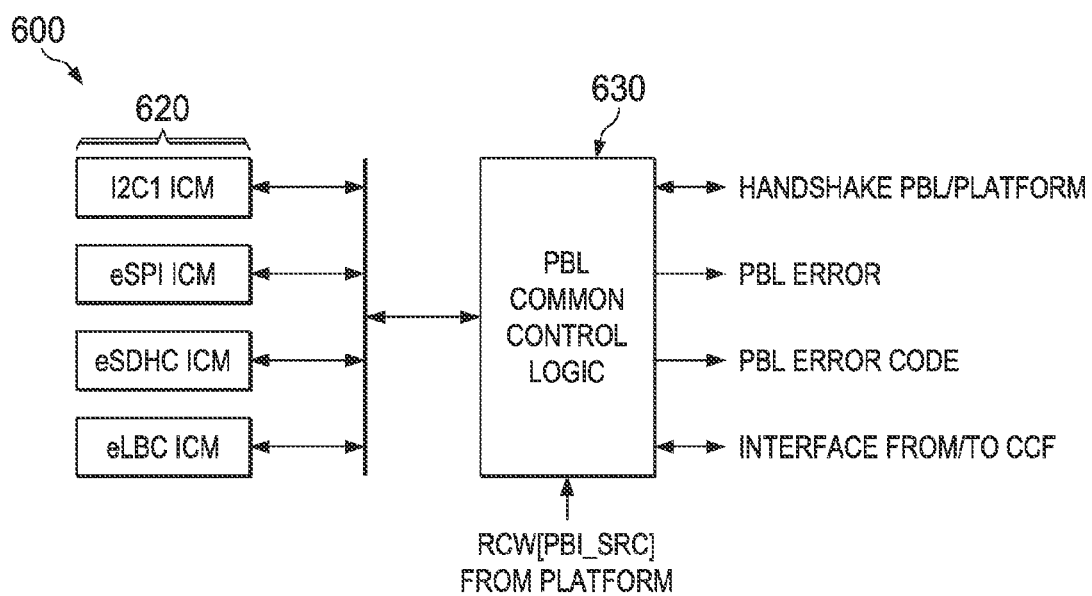
FIG. 6 illustrates how the RCW and PBI control the basic configuration of an example QORIQ e500-mc multicore processor by FREESCALE SEMICONDUCTOR.

FIG. 6 illustrates how the RCW and PBI control the basic configuration of an example FREESCALE QORIQ e500-mc multicore processor. In particular, FIG. 6 provides an example of how the RCW and PBI bit streams control the initial set up of I/O and memory control registers in the QORIQ multicore processor. The block diagram 600 shows the various internal I/O interface control modules (ICMs) 620 connected and controlled through a common internal bus by the Pre-Boot Loader 630 using the initial RCW and the PBI bit streams supplied by the secure boot FPGA. The validation of the RCW and PBI is one of the most critical and fundamental aspects of the secure boot mechanization. The secure boot FPGA of this invention and the three phase secure boot process detailed here-in successfully demonstrated a 100% validated secure boot process and subsequent implementation of a multi-level security system using a multicore QORIQ processor complex.

Figure 7:
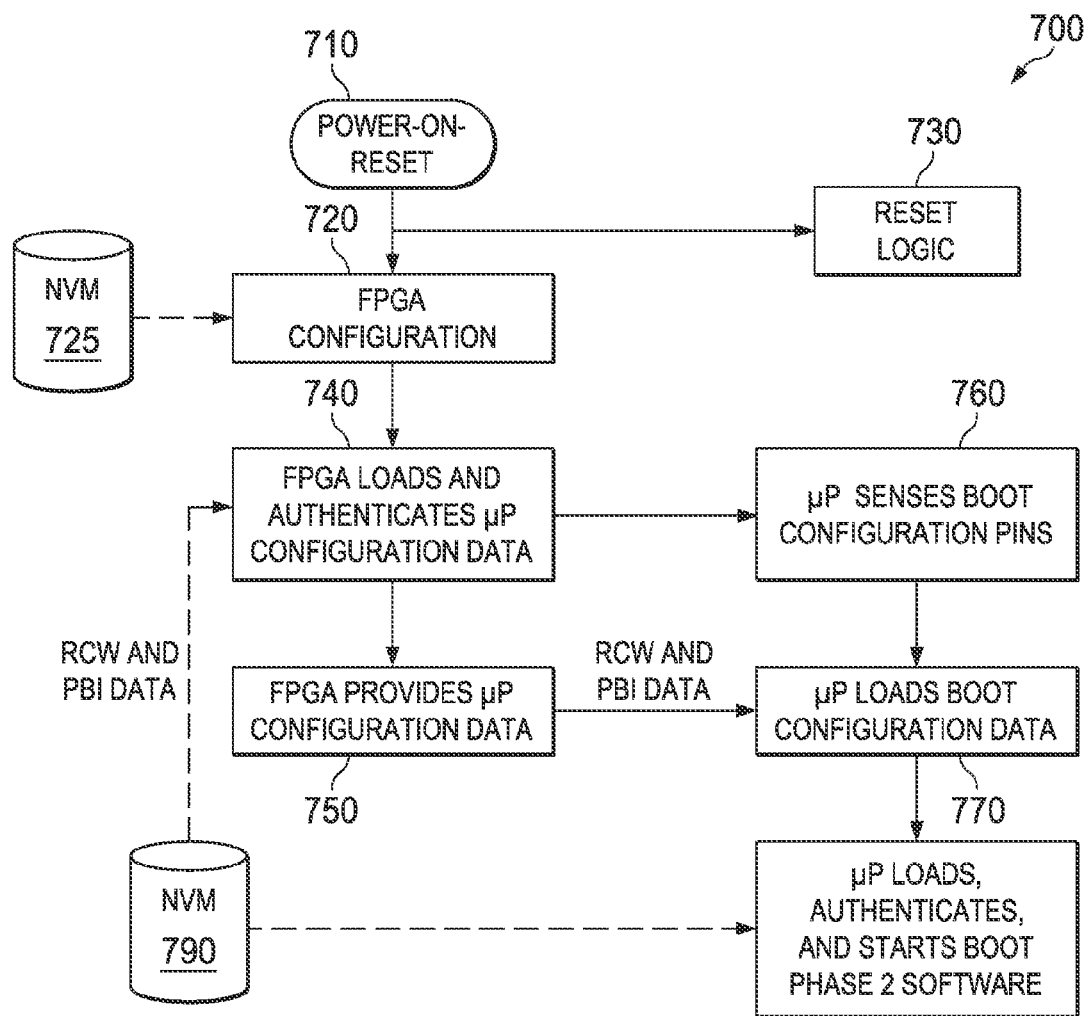
FIGS. 7 and 8 are two embodiments that describe the flow of secure boot process, according to an embodiment of the disclosure.
Figure 8:
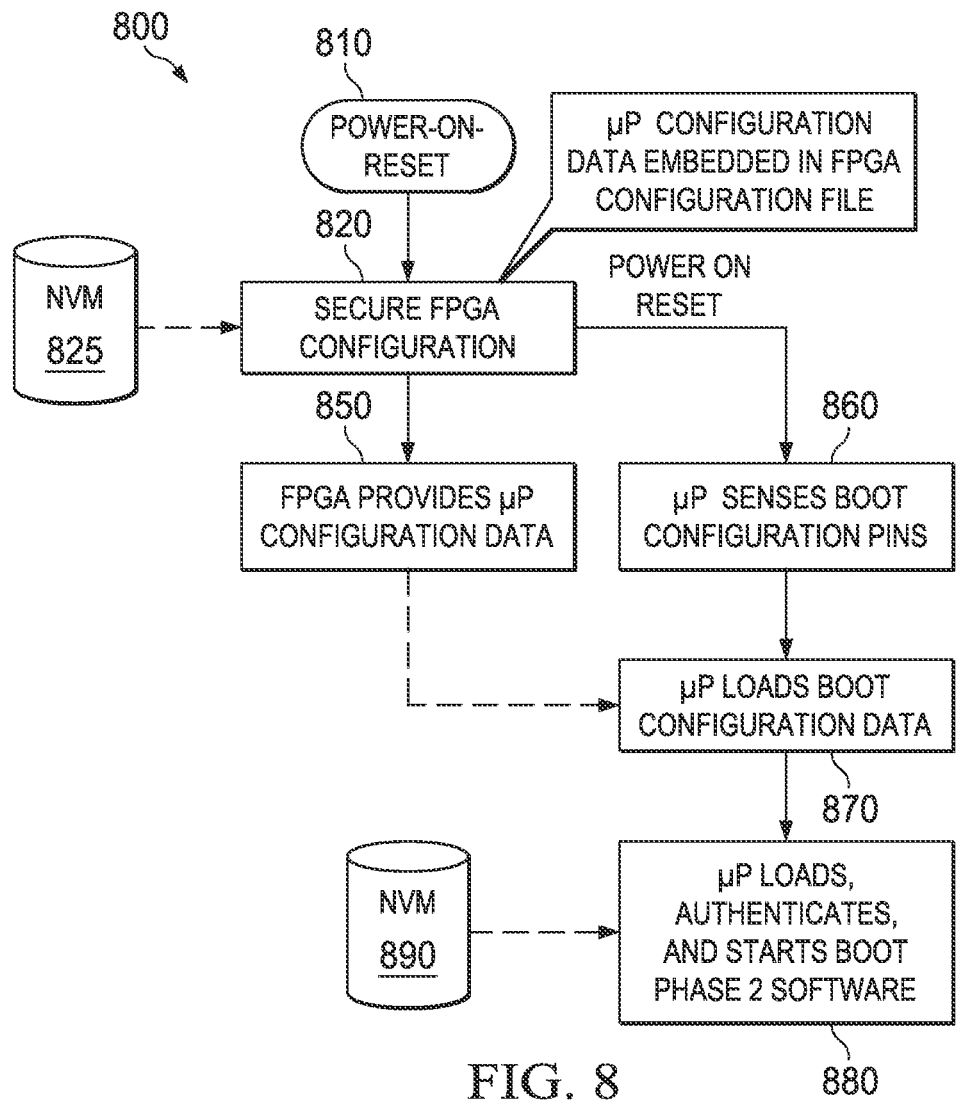

FIGS. 7 and 8 are two embodiments that describe the flow of secure boot processes 700 and 800, according to embodiments of the disclosure. In the first embodiment with secure boot process 700, the secure FPGA (secure boot device) first boots itself upon a power-on-reset and goes through its logic validation, while the processors are still held at reset by an external logic 730. The secure FPGA controls the release of the Reset to the processors. As illustrated in FIG. 7, after the FPGA gets the Power-on-Reset (710), it goes through its own configuration (720). The FPGA's configuration data can come from a separate NVM 725 or shared NVM 790. Then the FPGA loads the Reset control data and the pre-boot image of the processors from an external NVM 790 and authenticates the processors configuration data (740). After successful authentication, the FPGA releases the Reset signal to Reset Logic 730, which then releases the Power-on-Reset to the processors. The processors wakes up by first sensing its boot configuration pins (760). At the same time, the FPGA drives the processors reset configuration pins (740) to indicate the chosen initial boot path. After the processors have indicated that they are ready to receive the initial RCW and PBI, the secure FPGA provides the processors configuration data to the processors (750). The processors load the boot configuration data (770). After the processors have completed the pre-boot sequence, they go to an external NVM 790 to fetch the ISBC to begin phase-2 of the secure boot process and implement the security rules as described earlier. After completion of phase-2, they fetch the ESBC pointer to begin phase-3 and go through validation and initializations of the external system components.

In the second embodiment, the secure boot process differs from the first embodiment in that the configuration data—such as the RCW and PBI—are embedded as part of the secure boot device (FPGA) configuration file. After Power-on-Reset (810), the secure FPGA downloads the configuration bits from a NVM 825 and goes through configuration (820). Part of this configuration file is the processors' configuration data including the RCW and PBI. This step (820) also includes the validation of the RCW and PBI along with validating the FPGA configuration data. The processors are kept at reset until the secure boot device completed the security validations of the RCW and PBI. Then the Power-on-reset is released to the processors. The processors sense their boot configuration pins (860). Based on the boot mode sensed, the processors read the configuration data (870). The configuration data is provided by the secure boot device (850). The processors then loads the configuration data that was earlier validated by the secure boot device, authenticates the CSF (880) and starts the ISBC phase. The ISBC may be contained in the NVM 890 or in the NVM 825 or in a unified non-volatile memory (not shown).

In the secure boot process 700 and 800, the FIGS. 7 and 8 illustrates one embodiment where the NVMs are external (in private or shared memory space) to the FPGA. However, other configurations that are contemplated by this disclosure and not shown, include the internal NVM inside the secure boot device (such as FPGA) instead of, or in addition to the external NVM(s). Other configurations contemplated and not shown are a global shared memory NVM or combinations of internal, external private and external shared NVMs. Several variations of this invention can be envisioned by one skilled in the art. For example, the FPGA can have some or all the boot data embedded as part of the secure FPGA's configuration file or internal NVM. Alternatively, some or all of the configuration and boot parameters and command files can be in external NVM or RAM. All secure validations can be done by one or more FPGA's or some in the secure NPGA(s) and some in the external logic. Some or all of the reset control functions can be absorbed inside the FPGA or performed by external logic. Many combinations and variations are possible based on the underlying concepts presented herein and these variations are anticipated by this invention.

In this disclosure, a secure system is implemented using a secure processing system that uses a three phase secure boot process to configure and validate the processor, memory, I/O and rest of the system components using a hierarchical secure boot strapping process. Such a validated boot process supports the implementation of a multilevel security (MLS) to construct a secure system.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A processing system comprising:
   one or more secure boot devices, each of the one or more secure boot devices comprising a programmable logic device or a Field Programmable Gate Array (FPGA); and
   one or more processors or processing cores configured via programming to read processor configuration data upon power-on-reset from the one or more secure boot devices as part of a boot sequence,
   wherein at power-on-reset, the one or more secure boot devices are configured via programming to fetch and validate for conformance to one or more security rules some or all of the processor configuration data before the processor configuration data are presented to the one or more processors or processing cores, and
   wherein the one or more processors or processing cores are further configured via a to validate a first pointer to an internal command sequence file and commands for an Internal Secure Boot Code (ISBC) phase using one or more first security checks before executing the ISBC phase.

2. The processing system of claim 1, wherein the one or more processors or processing cores are kept at reset until the one or more secure boot devices have validated the processor configuration data.

3. The processing system of claim 1, wherein the one or more processors or processing cores are configured via programming to validate a second pointer to an external command sequence file and commands for an External Secure Boot Code (ESBC) phase using one or more second security checks before executing the ESBC phase.

4. The processing system of claim 1, wherein the processor configuration data is stored as part of configuration data of the one or more secure boot devices.

5. The processing system of claim 1, wherein the processor configuration data is stored in an external non-volatile memory (NVM).

6. The processing system of claim 1, wherein logic of the one or more secure boot devices is validated for conformance to the one or more security rules before the one or more secure boot devices validate the processor configuration data.

7. A secure system comprising:
one or more processors or processing cores configured via programming to read one or more processor boot images upon power-on-reset as part of a boot sequence; and
one or more secure boot devices, each of the one or more secure boot devices comprising a programmable logic device or a Field Programmable Gate Array (FPGA) configured via programming to provide the one or more processor boot images to the one or more processors or processing cores,
wherein at power-on-reset, the one or more secure boot devices are configured via programming to fetch and validate some or all of the one or more processor boot images before the one or more processor boot images are presented to the one or more processors or processing cores at a start of the boot sequence, and
wherein the one or more processors or processing cores are configured via programming to validate a first pointer to an internal command sequence file and commands for an Internal Secure Boot Code (ISBC) phase using one or more first security checks before executing the ISBC phase.

8. The secure system of claim 7, wherein the one or more processors or processing cores are kept at reset until the one or more secure boot devices have validated the one or more processor boot images.

9. The secure system of claim 7, wherein the one or more processors or processing cores are configured via programming to validate a second pointer to an external command sequence file and commands for an External Secure Boot Code (ESBC) phase using one or more second security checks before executing the ESBC phase.

10. The secure system of claim 7, wherein at least one of the one or more processor boot images is stored as part of configuration data of a corresponding secure boot device.

11. The secure system of claim 7, wherein at least one of the one or more processor boot images is stored in one or more external non-volatile memories (NVM).

12. The secure system of claim 7, wherein logic of the one or more secure boot devices is validated for conformance to one or more security rules before the one or more secure boot devices validate the one or more processor boot images.

13. A method of booting one or more processors securely, the method comprising:
validating, upon a power-on-reset, some or all of processor configuration data or a boot image for conformance to one or more security rules before presenting the processor configuration data or boot image to the one or more processors using one or more secure boot devices each comprising a programming logic device or a Field Programmable Gate array (FPGA);
validating one or more remaining portions of the processor configuration data or the boot image under control of the one or more processors; and
validating a first pointer to an internal command sequence file and commands for an Internal Secure Boot Code (ISBC) phase using one or more first security checks before executing the ISBC phase.

14. The method of claim 13, wherein the validating upon power-on-reset includes keeping the one or more processors at reset until some or all of the processor configuration data or the boot image is validated by the one or more secure boot devices.

15. The method of claim 13, further comprising:
validating a second pointer to an external command sequence file and commands for an External Secure Boot Code (ESBC) phase using one or more second security checks before executing the ESBC phase.

16. The method of claim 13, wherein the processor configuration data or the boot image is stored as part of configuration data of the one or more secure boot devices.

17. The method of claim 13, wherein the processor configuration data or the boot image is stored in an external non-volatile memory (NVM).

18. A method of booting one or more processors securely, the method comprising:
performing a pre-boot validation phase in which some or all of processor configuration data and a pre-boot image are validated before being presented to the one or more processors using one or more secure boot devices upon a power-on-reset, wherein each of the one or more secure boot devices comprises a programming logic device or a Field Programmable Gate Array (FPGA);
performing an Internal Secure Boot Code (ISBC) phase in which a first pointer to an internal command sequence file and commands for the ISBC phase are validated by security checks comprising encryption, decryption, key comparisons, privilege checking or signature correlation before executing the ISBC phase; and
performing an External Secure Boot Code (ESBC) phase in which a second pointer to an external command sequence file and commands for the ESBC phase are validated by security checks comprising encryption, decryption, key comparison, privilege checking or signature correlation before executing the ESBC phase.

19. The method of claim 18, wherein the processor configuration data is stored as part of configuration data of the one or more secure boot devices.

20. The method of claim 18, wherein the processor configuration data is stored in an external non-volatile memory (NVM).

* * * * *